(12) United States Patent
Crawford et al.

(10) Patent No.: US 6,954,331 B2
(45) Date of Patent: Oct. 11, 2005

(54) MAGNETIC RECORDING HEAD INCLUDING SPATIALLY-PUMPED SPIN WAVE MODE WRITER

(75) Inventors: Thomas McLendon Crawford, Pittsburgh, PA (US); Mark William Covington, Pittsburgh, PA (US); Gregory John Parker, Warrendale, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/180,151

(22) Filed: Jun. 26, 2002

(65) Prior Publication Data

US 2003/0039068 A1 Feb. 27, 2003

Related U.S. Application Data

(60) Provisional application No. 60/313,920, filed on Aug. 21, 2001.

(51) Int. Cl.$^7$ .............................. G11B 5/17; G11B 5/127
(52) U.S. Cl. ........................................ 360/123; 360/125
(58) Field of Search ................................ 360/126, 125, 360/123, 124

(56) References Cited

U.S. PATENT DOCUMENTS

| | | | |
|---|---|---|---|
| 2,844,789 A | 7/1958 | Allen | |
| 3,629,520 A | 12/1971 | Schwee | |
| 3,660,828 A | 5/1972 | Irons et al. | |
| 3,811,941 A | 5/1974 | Morgenthaler | |
| 4,618,901 A | 10/1986 | Hatakeyama et al. | |
| 4,684,206 A | 8/1987 | Bednorz et al. | |
| 5,057,957 A | 10/1991 | Ito et al. | |
| 5,195,005 A | 3/1993 | Mallary et al. | |
| 5,311,386 A | 5/1994 | Mallary | |
| 5,333,086 A | 7/1994 | Frey et al. | |
| 5,365,391 A | 11/1994 | Sugiyama et al. | |
| 5,375,023 A | 12/1994 | Ju et al. | |
| 5,396,391 A | 3/1995 | Tanaka et al. | |
| 6,011,664 A | 1/2000 | Kryder et al. | |
| 6,016,290 A | 1/2000 | Chen et al. | |
| 6,278,590 B1 | 8/2001 | Gill et al. | |
| 6,359,744 B1 | 3/2002 | Mallary | |
| 6,404,706 B1 | 6/2002 | Stovall et al. | |
| 6,525,892 B1 | 2/2003 | Dunbar et al. | |
| 6,671,128 B2 * | 12/2003 | Crawford | ............... 360/234.5 |
| 2002/0027750 A1 * | 3/2002 | Shukh et al. | ............... 360/123 |
| 2002/0071208 A1 * | 6/2002 | Batra et al. | ............... 360/125 |
| 2002/0131203 A1 | 9/2002 | Litvinov et al. | |

FOREIGN PATENT DOCUMENTS

| | | |
|---|---|---|
| JP | 60129952 | 7/1985 |
| JP | 05234170 | 9/1993 |
| JP | 07021613 | 1/1995 |

OTHER PUBLICATIONS

U.S. Appl. No. 10/023,670, filed Dec. 18, 2001, Crawford.
J. Jury et al., "Design of a Single–turn Microstrip Write Head for Ultra–high Data Rate Recording", *IEEE Trans. On Magn.*, vol. 35, No. 5, Sep. 1999, pp. 2547–2549.

(Continued)

*Primary Examiner*—Craig A. Renner
(74) *Attorney, Agent, or Firm*—Alan G. Towner, Esq.; Pietragallo, Bosick & Gordon

(57) ABSTRACT

The present invention provides magnetic recording heads which utilize higher order excitations of dynamic magnetization to increase frequency without the necessity of biasing the write yoke. In accordance with the present invention, the size and placement of current-carrying microstrip waveguide(s) and write pole(s) are controlled in order to generate spin wave write modes. During writing operations, the magnetization is driven into higher order spatial spin wave modes.

30 Claims, 10 Drawing Sheets

OTHER PUBLICATIONS

K. Ouchi, "Recent Advancements in Perpendicular Magnetic Recording", *IEEE Transactions on Magnetics*, vol. 37, No. 4, Jul. 2001, pp. 1217–1222.

Abstract, "Parametric Excitation of Spin Waves by Spatially Localized Pumping of Tangentially Magnetized Yttrium Iron Garnet Films", *Zhurnal Eksperimental Noi I Teoreticheskoi Fiziki*, XP002232785, Feb. 2000.

Abstract, "Magnon Excitation by Spin Injection in Thin Fe/Cr/Fe Films", *Physical Review Letters*, XP002232786, May 1, 2000.

* cited by examiner

MAGNETIC RECORDING HEAD INCLUDING SPATIALLY-PUMPED SPIN WAVE MODE WRITER

CROSS REFERENCE TO RELATED APPLICATION

This application claims the benefit of U.S. Provisional Patent Application Ser. No. 60/313,920 filed Aug. 21, 2001.

FIELD OF THE INVENTION

The present invention relates to magnetic recording heads, and more particularly relates to magnetic write heads with microstrip waveguides which control write pole magnetization.

BACKGROUND INFORMATION

Longitudinal and perpendicular recording heads for use with a magnetic storage medium are generally known. Longitudinal recording heads utilize a pair of opposing write poles with their tips in close proximity to each other at the bottom surface of the recording head. The two poles are connected at the top by a yoke, which may be made of a ferromagnetic material similar to that used for the poles. In conventional designs, a coil having multiple turns surrounds the yoke in close proximity to the two opposing poles. When a current is passed through the coil, magnetic flux is induced in the yoke, which produces a magnetic field across a write gap separating the two poles. A portion of the magnetic flux across the write gap passes through the magnetic storage medium, thereby causing a change in the magnetic state within the magnetic storage medium to modify the bits of information on the storage medium. The recording densities possible with longitudinal recording are believed to be limited to approximately 50 to 100 Gbit/inch$^2$ because, at higher recording densities, superparamagnetic effects result in magnetic instabilities within the magnetic storage medium.

Perpendicular recording has been proposed to overcome the recording density limitations of longitudinal recording. Perpendicular recording heads for use with magnetic storage media may include a pair of magnetically coupled poles connected by a yoke. The main write pole has a small bottom surface area while the flux return pole has a large bottom surface area. In conventional designs, a coil having a plurality of turns is located adjacent to the yoke or main write pole for inducing a magnetic field between the write pole and a soft underlayer of the recording medium. The soft underlayer is located below the hard recording layer of the magnetic storage medium and enhances the amplitude of the field produced by the main pole. This in turn allows the use of storage medium with higher coercive force. Consequently, more stable bits can be stored in the medium.

In conventional write head designs, the switching speed limit (non eddy-current limited) occurs when the write head exhibits ferromagnetic resonance (FMR). The presence of underdamped FMR oscillations in the write field may cause distorted write field shapes in the media. Furthermore, the flux transmission velocity through the write head yoke is not necessarily equal to the FMR-limited switching speed.

Also, in conventional writers, the coil is placed relatively far away from the air bearing surface (ABS), and the driving field is predominantly located at the back region where the write poles are connected by the yoke. The writing field that emerges from the pole tips relies on flux transmission through a dispersive medium, which acts to broaden and slow the dynamic magnetization. Even if switching speeds near the ferromagnetic resonance point can be generated, the magnetization will switch fast only where a fast magnetic field exists to drive the magnetization. Therefore, at high data rates, conventional designs may be limited by the dispersion characteristics of the mode propagating through the yokes to the pole tips.

The present invention has been developed in view of the foregoing and to address other deficiencies of the prior art.

SUMMARY OF THE INVENTION

The present invention provides magnetic recording heads which utilize higher order excitations of dynamic magnetization to increase frequency without the necessity of biasing the write yoke. In accordance with the present invention, the size and placement of current-carrying microstrip waveguide(s) and write pole(s) are controlled in order to generate spatially non-uniform magnetization patterns or spin waves in the magnetic films which comprise the write head. During writing operations, the magnetization is driven into these spin wave modes.

An aspect of the present invention is to provide a magnetic writer for use with a magnetic storage medium. The writer comprises at least one write pole and at least one microstrip structured and arranged to generate magnetization in the write pole which includes at least one spin wave mode.

Another aspect of the present invention is to provide a magnetic writer, comprising at least one write pole and means for generating magnetization in the write pole which includes at least one spin wave mode.

A further aspect of the present invention is to provide a method of applying a magnetic write field to a magnetic storage medium. The method includes the steps of providing at least one write pole in proximity to the magnetic storage medium, and generating magnetization in the write pole which includes at least one spin wave mode to thereby apply the magnetic write field to the magnetic storage medium.

These and other aspects of the present invention will be more apparent from the following description.

DETAILED DESCRIPTION

Figure 1:
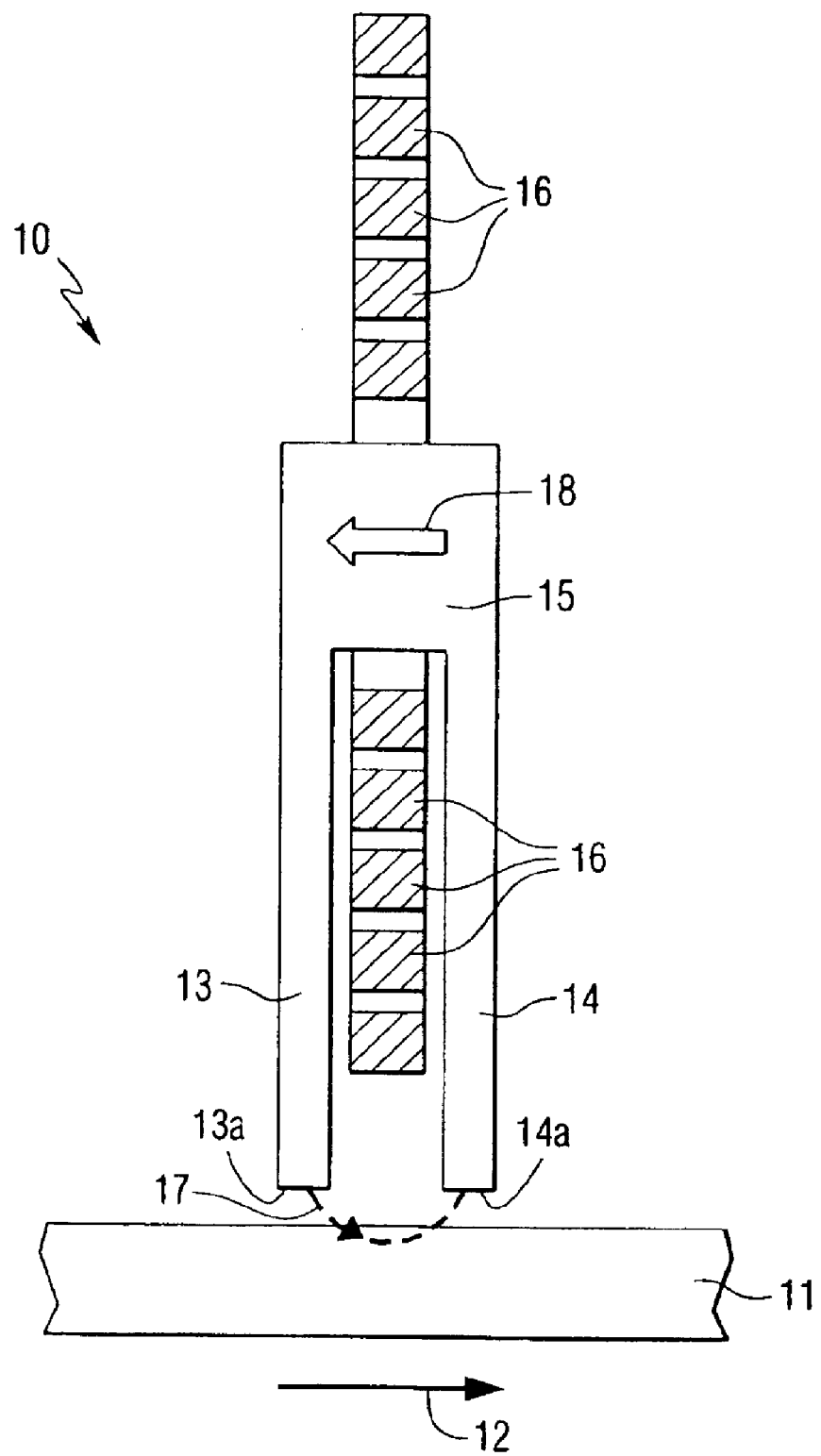
FIG. 1 is a partially schematic side view of a conventional longitudinal magnetic recording head including a pair of opposing write poles connected by a yoke which is surrounded by a multiple-turn coil.
Figure 2:
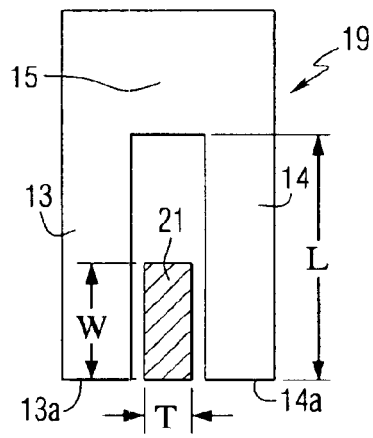
FIGS. 2–6 are partially schematic side views of longitudinal magnetic writers with opposing write poles and one or two current-carrying microstrip waveguides which are configured to induce different types of spin wave write modes, in accordance with embodiments of the present invention.

FIG. 1 illustrates a conventional longitudinal writer 10 positioned over a magnetic recording medium 11. During recording operations, the recording medium 11, such as a magnetic disc, moves in the direction of the arrow 12 in relation to the writer 10. The writer 10 includes two write poles 13 and 14 connected by a yoke 15. The write poles 13 and 14 have write pole tips 13a and 14a located at the air bearing surface of the writer 10. A multiple-turn coil 16 surrounds the yoke 15. The coil 16 is located relatively far away from the write pole tips 13a and 14a and the air bearing surface of the writer 10. When current is applied through the coil 16, a writing field 17 is generated from the pole tips 13a and 14a. With the conventional arrangement shown in FIG. 1, the driving field 18 is predominantly located at the back yoke 15. The writing field 17 that emerges from the write pole tips 13a and 14a relies on flux transmission from the yoke 15 to the pole tips 13a and 14a. The yoke 15 and poles 13 and 14 are dispersive magnetic media which will broaden and slow the flux as it travels through these films.

The present invention provides a writer design for both longitudinal and perpendicular magnetic recording systems, which uses one or more microstrips to energize the yoke magnetization. As used herein, the term "microstrip" means a current-carrying wire which has been designed to have controlled high frequency properties, such as in a microstrip waveguide. The microstrip is a planar transmission line having a characteristic impedance which is approximately constant as a function of frequency up to or exceeding 15 or 20 GHz. The microstrips are configured with their spacing and size relative to the write pole length such that they spatially pump the magnetization into an optimum spin wave mode configuration, instead of, or in addition to, a uniform FMR mode.

A uniform mode is one where the magnetization precesses uniformly across a magnetic film. Spin wave modes refer to a class of higher energy excitations. These spin waves are considered to be magnetostatic spin waves because they have spatial wavelengths which are much longer than the exchange length in the material. For small geometry films, such modes may be called exchange spin waves or exchange modes. In an infinite sheet film, these modes exist as a continuum with a characteristic frequency vs. wavevector dispersion curve (Damon-Eshbach modes). However, when the film is geometrically confined, such as in the present yoke designs, the continuum collapses into discrete standing wave modes with quantized wavevectors across the confined dimensions of the film.

The modes have spatial patterns which follow: $\sin(n\pi y/L + \Phi)$, where n is the mode index, starting from n=0, L is the length of the film in the confined direction, y is the position along the length L of the film, and the $\Phi$ is a phase factor determined by the boundary conditions, e.g., a pinned boundary, an unpinned boundary, or a combination thereof. A pinned boundary means that the magnetization angle approaches or equals zero at the pole tip edge. An unpinned boundary means that the magnetization angle approaches or equals 90 degrees at the pole tip edge. The magnetization pattern will follow this configuration, and depends on the boundary conditions which apply to the magnetization at the geometrically confined edges. The uniform FMR mode corresponds to n=0 for unpinned boundaries and n=1 for pinned boundaries. The spin wave modes of the present invention may range from n=0 to n=10 or higher, typically from n=1 to n=4. A particularly suitable magnetostatic mode is n=3.

Spatial pumping achieved in accordance with the present invention provides several advantages for high data rate writers. Higher order spatial spin wave modes have higher spin precession frequencies than the uniform FMR mode. This extended frequency range allows the writer to perform at higher data rates than with a uniform mode design. As a further advantage, a strong spatial coupling to a higher order mode created by the geometry of the driving magnetic field may produce a desired magnetization configuration at the pole tips more efficiently than designs which rely purely on flux focusing, especially at pole tip widths of less than 100 nm. The energy transfer from the microstrip's current-induced field to the pole tip magnetization may be more efficient if the geometries are optimized to create a spatially preferred tip magnetization. Another advantage of the present design is that the write field rise time may also be faster if it is dependent on a geometrically excited magnetostatic mode configuration rather than on flux transmission over a significant distance, e.g., greater than about 5 microns.

One embodiment of the present invention provides a standing wave mode resonator. Another embodiment of the present invention provides a ring mode resonator. The standing wave resonator may be comprised of a single magnetic film with the microstrip(s) pumping standing wave magnetostatic modes. The ring resonator may consist of two poles (and soft underlayer for perpendicular recording) with the current-carrying microstrip(s) pumping the modes using periodic boundary conditions. The boundary conditions may be optimized to maximize the magnetic field seen by the media under the writing pole while minimizing it under the return pole. In accordance with an embodiment of the present invention, the microstrips can be placed very close to the ABS, compared with traditional writer designs as illustrated in FIG. 1 in which the multiple-turn coil is located relatively far from the ABS.

FIGS. 2–19 illustrate examples of spatial pumping in write yokes. Pumping of n=1, 2, 3 and 4 spin wave modes are illustrated using either one or two current-carrying microstrips. However, higher order modes of n=5 and above may also be used in accordance with the present invention.

FIGS. 2–6 are partially schematic side views of longitudinal magnetic writers with opposing write poles and one or two current-carrying microstrip waveguides which are configured to induce different types of spin wave write modes, in accordance with embodiments of the present invention. In the embodiment shown in FIG. 2, the writer 19 includes write poles 13 and 14 connected by a yoke 15. The write pole tips 13a and 14a are provided at the air bearing surface of the writer 19. A current-carrying microstrip waveguide 21 is located between the write poles 13 and 14 near the air bearing surface. In accordance with the embodiment shown in FIG. 2, the microstrip 21 has a thickness T and width W, while the write poles 13 and 14 each have a length L. The width W of the microstrip 21 and the length L of the write poles 13 and 14 are selected such that an n=1 (unpinned) or n=2 (pinned) spin wave mode is generated. Furthermore, the position of the microstrip 21 along the length L of the write poles is selected in order to generate the n=1 spin wave mode. In this embodiment, the width W of the microstrip 21 is approximately one-half of the length L of the write poles 13 and 14. In addition, the microstrip 21 is positioned along the length L of the write poles 13 and 14 adjacent to the write pole tips 13a and 14a. This configuration generates the n=1 spin wave mode, while at the same time positioning the microstrip 21 at or near the air bearing surface. Alternatively, an n=1 spin wave mode could be generated by moving the microstrip 21 away from the pole tips 13a and 14a adjacent the yoke 15. However, such an alternative configuration which positions the microstrip away from the air bearing surface may result in rise time degradation.

Figure 3:
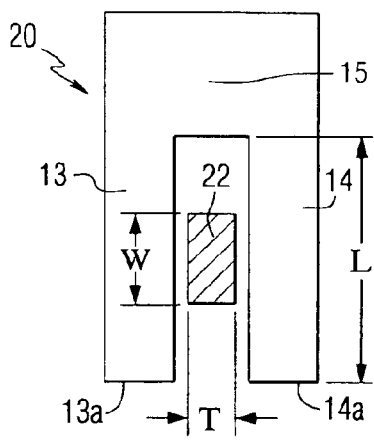

FIG. 3 illustrates an n=2 spin wave mode writer 20 in accordance with an embodiment of the present invention. The writer 20 includes write poles 13 and 14 connected by a yoke 15 similar to the embodiment shown in FIG. 2. However, the writer 20 of FIG. 3 includes a microstrip waveguide 22 that is configured to generate an n=2 spin wave mode. In this embodiment, the width W of the microstrip 22 is approximately one-third of the length L of the write poles 13 and 14. The microstrip 22 is also positioned one-half of the distance L along the write poles 13 and 14. As more fully described below and shown in FIGS. 8 and 13, the size and position of the microstrip 22 create oppositely directed magnetic fluxes in the opposing sections of the poles 13 and 14.

Figure 4:
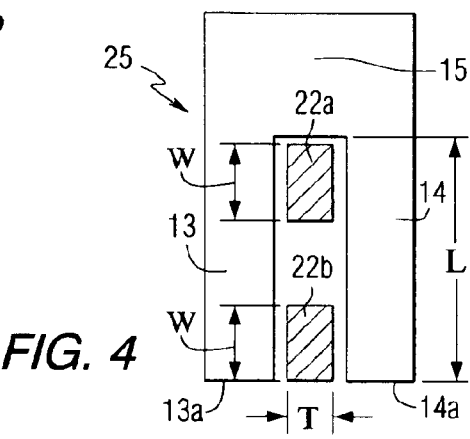

FIG. 4 illustrates an n=2 spin wave mode writer 25 in accordance with another embodiment of the present invention. The writer 25 includes write poles 13 and 14 connected by a yoke 15 similar to the embodiment shown in FIG. 3. However, the writer 25 of FIG. 4 includes two microstrip waveguides 22a and 22b positioned near the yoke 15 and pole tips 13a, 14a, respectively. In this embodiment, the width W of each microstrip 22a and 22b is approximately one-third of the length L of the write poles 13 and 14. As more fully described below and shown in FIGS. 9 and 14, the sizes and positions of the microstrips 22a and 22b create oppositely directed magnetic fluxes in the opposing sections of the poles 13 and 14.

Figure 5:
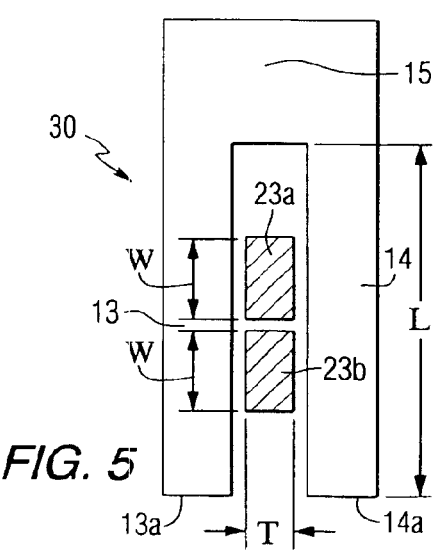

FIG. 5 illustrates an n=3 spin wave mode writer 30 in accordance with another embodiment of the present invention. The writer 30 includes write poles 13 and 14 connected by a yoke 15 similar to the embodiment shown in FIG. 2, except the writer 30 includes two microstrip waveguides 23a and 23b configured to generate an n=3 spin wave mode. In this embodiment, the width W of each microstrip 23a and 23b is approximately one-fourth of the length L of the write poles 13 and 14. The microstrips 23a and 23b are positioned next to each other along the length L of the write poles 13 and 14 as shown in FIG. 5. As more fully described below and shown in FIGS. 10 and 15, the sizes and positions of the microstrips 23a and 23b create oppositely directed magnetic fluxes in the opposing sections of the poles 13 and 14 in such a manner that produces an n=3 spin wave mode.

Figure 6:
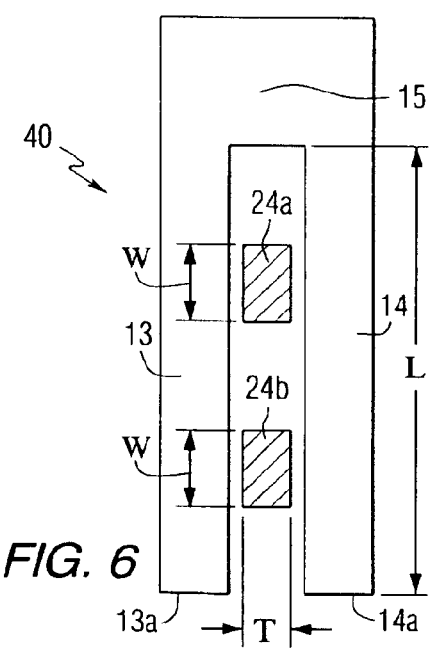
Figure 7:
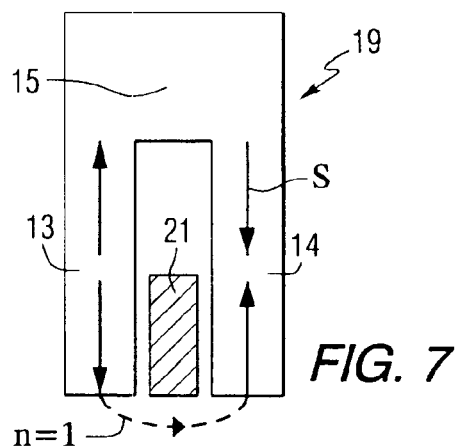
FIGS. 7–11 are partially schematic side views of the longitudinal magnetic writers shown in FIGS. 2–6, respectively, further illustrating various spatially pumped spin wave write modes.
Figure 8:
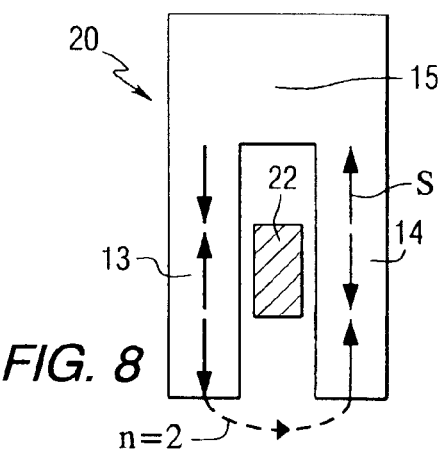
Figure 9:
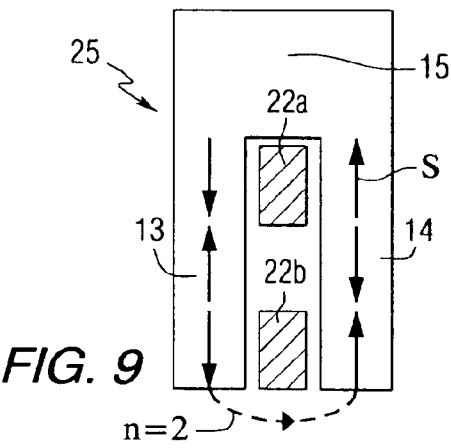
Figure 10:
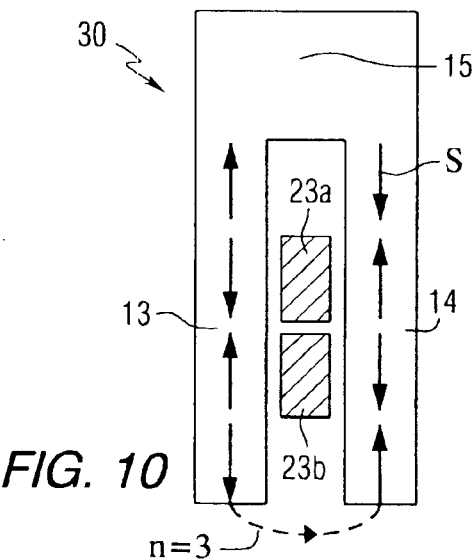
Figure 11:
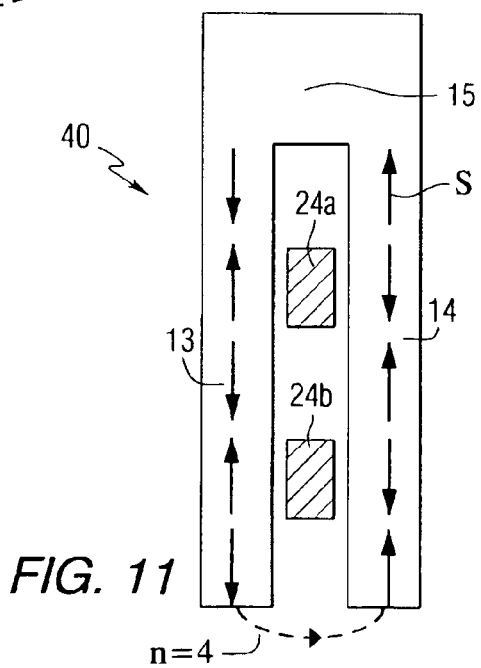
Figure 12:
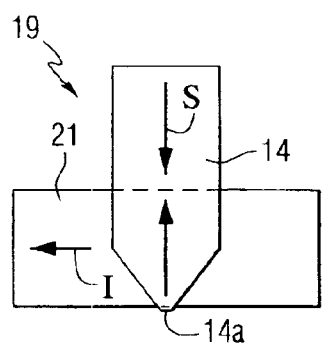
FIGS. 12–16 are partially schematic front views of the write pole and microstrip configurations shown in the embodiments of FIGS. 2–6, respectively.
Figure 13:
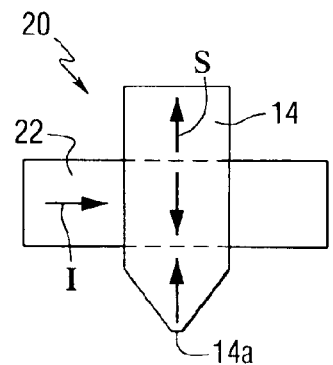
Figure 14:
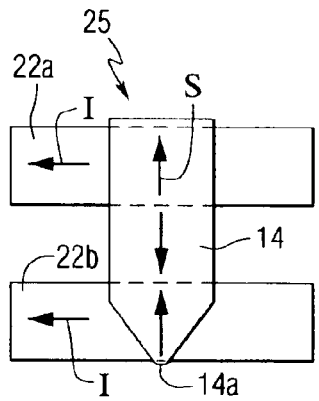
Figure 15:
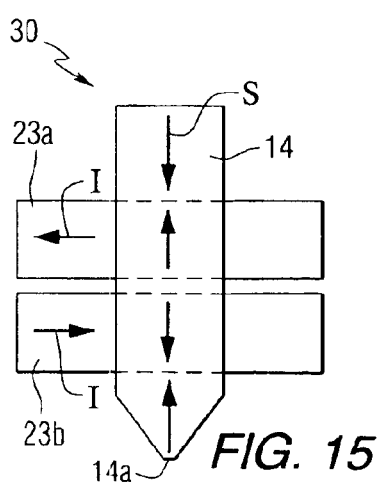
Figure 16:
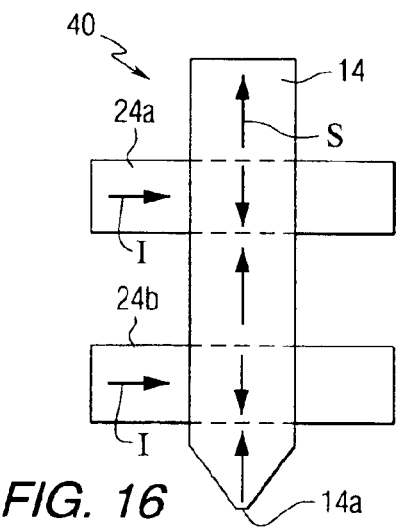

FIG. 6 illustrates an n=4 spin wave mode writer 40 in accordance with a further embodiment of the present invention. The writer 40 includes write poles 13 and 14 connected by a yoke 15 similar to the embodiment shown in FIG. 2, except the writer 40 includes two microstrip waveguides 24a and 24b configured to generate an n=4 spin wave mode. In this embodiment, the width W of each microstrip 24a and 24b is approximately one-fifth of the length L of the write poles 13 and 14. The microstrips 24a and 24b are also positioned at the two-fifth and four-fifth positions along the length L of the write poles 13 and 14. As more fully described below and shown in FIGS. 11 and 16, the configuration of the microstrips 24a and 24b create oppositely directed magnetic fluxes in the opposing sections of the poles 13 and 14 in such a manner that produces an n=4 magnetostatic mode.

In the embodiments shown in FIGS. 2–6, the width W of each microstrip may range from about 20 to about 2,000 nm, typically from about 50 to about 1,500 nm. The thickness T of each microstrip may range from about 10 to about 2,000 nm, typically from about 100 to about 1,000 nm. The length L of each write pole may range from about 100 to about 10,000 nm, typically from about 500 to about 5,000 nm. The ratio of the width of each microstrip to the length of the write pole W:L is typically from about 1:2 to about 1:5. The microstrip may be located at or near the air bearing surface, for example, less than 100 nm from the surface in the embodiment shown in FIG. 2 and less than 2,000 nm in the embodiments shown in FIGS. 3–6. The microstrip may be slightly recessed from the ABS if necessary to control pole tip recession.

The microstrips shown in FIGS. 2–6 may be made of any suitable material such as copper, gold or aluminum. The write poles and yoke may be made of any suitable material such NiFe, FeCoB or FeCo. The microstrips, write poles and yokes may be fabricated by standard techniques such as vacuum sputtering, electrodeposition and photolithography.

Any desired spin wave mode(s) may be selected. For example, to switch from n=3 to n=4, the microstrips are spaced differently and the current propagation directions are changed in the two microstrips from opposite to the same. The microstrip widths W are designed to be a specific fraction of the write pole length in order to couple to the desired higher order magnetostatic mode(s). Any of these geometries could be advantageous for a particular data rate, and may be selected on the basis of various design requirements. For example, the n=1 geometry may put the most applied current-induced field closest to the ABS. Such a design might have the fastest flux rise time but may not have the greatest efficiency, as compared with pumping a different mode.

FIGS. 7–11 are schematic side views showing how the microstrip arrangements in FIGS. 2–6 couple oppositely into the poles 13 and 14 to create spin wave modes S. The total yoke structure 13, 14 and 15 of each embodiment represents a nearly closed magnetic circuit. Periodic boundary conditions could be applied to the circuit instead of a standing wave boundary conditions (analogous to a ring laser cavity vs. a Fabry-Perot laser cavity). The unique boundary conditions of the yoke structure may require shifting the position and alignment of the microstrips within the yoke. This shifting may position the nodes in the magnetization pattern for optimal efficiency and maximum field in the write gap, as well as for properly controlling the yoke length L and pole spacing for maximum field.

FIGS. 12–16 are side views of the spin wave mode writers of FIGS. 7–11, respectively, illustrating the flow of current I through the microstrips and the resultant spin wave modes S generated in the write poles. The spin wave mode writers are shown in FIGS. 12–16 without yokes. In accordance with an embodiment of the present invention, the yokes 15 may optionally be eliminated while still maintaining spin wave mode operation.

Figure 17:
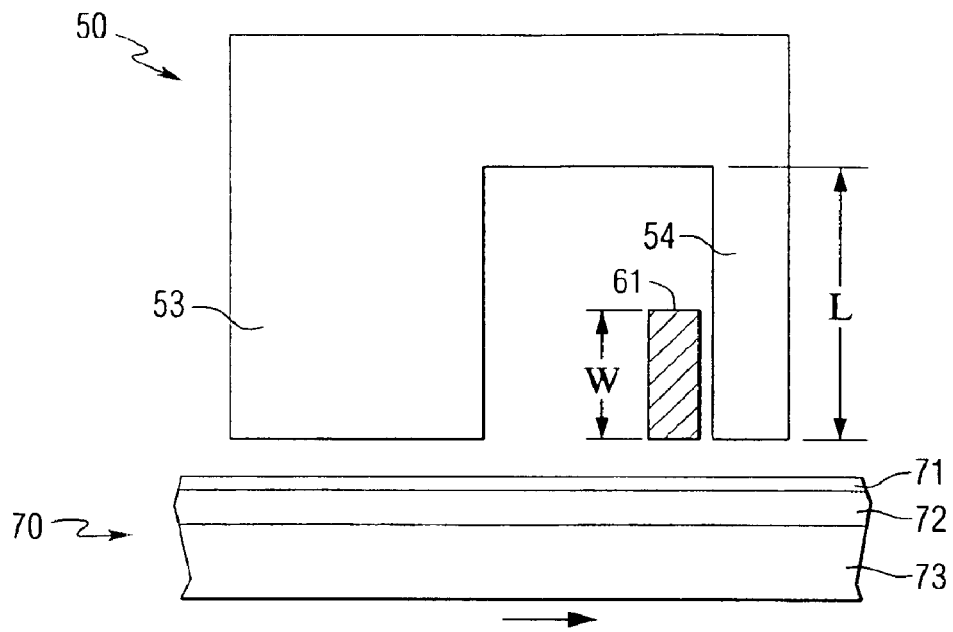
FIGS. 17 and 18 are partially schematic side views illustrating a perpendicular magnetic recording head including a current-carrying microstrip waveguide adjacent to the write pole which induces a spin wave write mode in accordance with an embodiment of the present invention.
Figure 18:
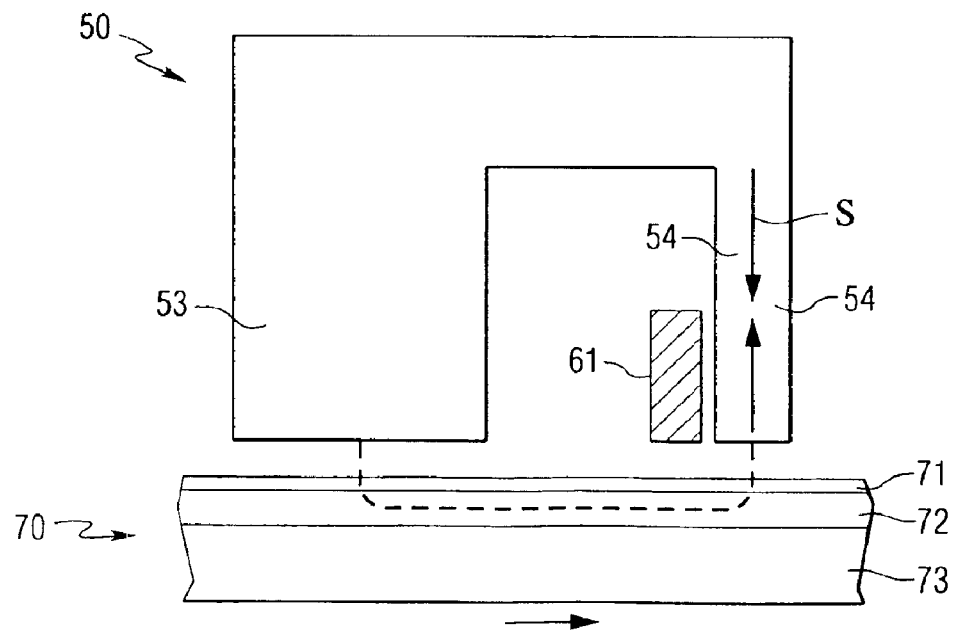

FIGS. 17 and 18 are partially schematic side views illustrating a perpendicular magnetic writer 50 in accordance with an embodiment of the present invention. The writer 50 includes a relatively large return pole 53 and a relatively small write pole 54. A microstrip waveguide 61 is located adjacent to the write pole 54. The width W of the microstrip 61 and the position of the microstrip 61 along the length L of the write pole 54 are selected such that an n=1 spin wave mode is generated. The microstrip 61 and write pole 54 configuration of the perpendicular writer 50 shown in FIG. 17 is thus similar to the configuration of the microstrip 21 and write pole 14 of the longitudinal writer 19 shown in FIG. 2. The write pole may be placed close to the soft underlayer of the recording medium, such that the boundary conditions are largely unpinned at the write pole 54. However, the return pole 53 may be recessed slightly such that the boundary conditions are partially pinned. This pinning will reduce the magnetic field under the return pole and help prevent it from writing.

As shown most clearly in FIG. 18, during writing operations, current applied to the microstrip 61 generates an n=1 spin wave mode S in the write pole 54. The recording medium 70, which moves in the direction of the arrow in relation to the perpendicular writer 50, is exposed to the magnetic field generated from the write pole 54. The recording medium 70 includes a hard magnetic perpendicular recording layer 71 on a soft magnetic underlayer 72. The layers 71 and 72 are deposited on a substrate 73. The magnetic write field, shown by the dashed line in FIG. 18, travels from the tip of the write pole 54 perpendicularly through the hard magnetic recording layer 71 into the soft magnetic underlayer 72 and back to the return pole 53.

The perpendicular writer 50 shown in FIGS. 17 and 18 may be modified from the n=1 mode shown to other modes. For example, the width W of the microstrip 61 and its position along the length L of the write pole 54 may be modified in a manner similar to that shown in FIG. 3 to provide an n=2 spin wave mode. Alternatively, the microstrip 61 may be replaced with two microstrips positioned at varying locations along the length L of the write pole 54 in order to provide n=2, n=3 and n=4 spin wave modes, similar to the embodiments shown in FIGS. 4, 5 and 6.

Figure 19:
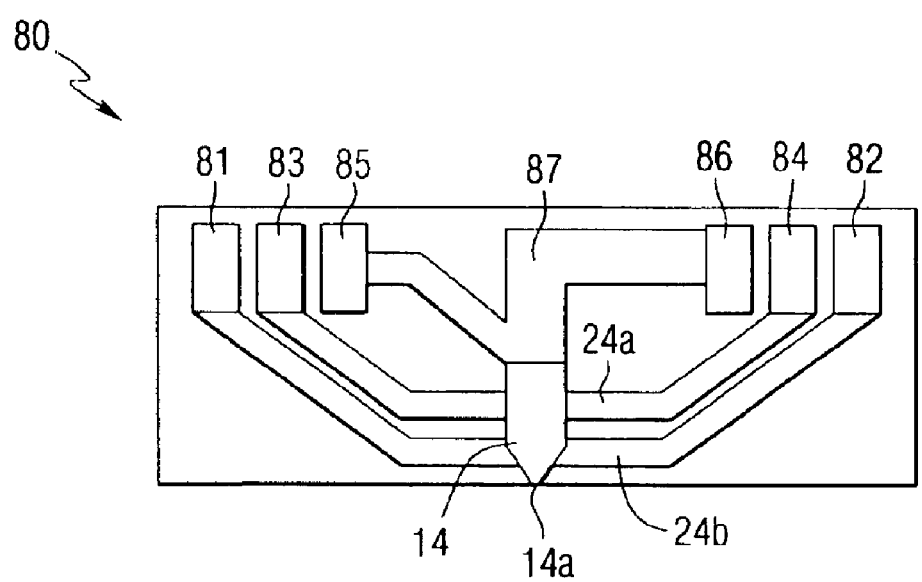
FIG. 19 is a partially schematic front view of a magnetic recording head illustrating electrical connections to two current-carrying microstrip waveguides located adjacent to a write pole of the recording head in accordance with an embodiment of the present invention.

FIG. 19 schematically shows a front view of a slider 80 with pads 81, 82, 83 and 84 required to apply the write currents to the write pole 14 with the proper polarities. Pads 85 and 86 provide bias current to the read element via the read element leads 87. FIG. 19 shows two microstrips for writing. However, a single microstrip may alternatively be used, which is more in line with traditional write coils in terms of required leads on the flex on suspension (FOS).

In one embodiment of the invention, a circuit may not be required for the write head. The head may be built with only the microstrip and top pole (e.g., one half the circuit in FIG. 19). Depending on boundary conditions, the higher order modes may be more efficient than the uniform mode and may not require a large return pole. In this case, the head would act as a standing wave resonator as opposed to a ring resonator.

In the present designs, the applied magnetic field from the microstrip(s) may be substantially closer to the write pole tips than it is in the design shown in FIG. 1. Since the flux has less distance to travel through the magnetic medium of the write pole, the rise time broadening effect will be substantially reduced compared with that of the writer shown in FIG. 1. Test results on patterned sheet films described in detail below indicate that the applied magnetic field may play an important role in both the rise time and in the degree of coupling to the spin wave modes of a patterned element (including the uniform mode). This coupling indicates that favorable efficiency may be achieved with the present writers, particularly considering the projected pole tip dimensions required for recording at areal densities, e.g., from 100 Gbit/in$^2$ to 1 Tbit/in$^2$.

Figure 21:
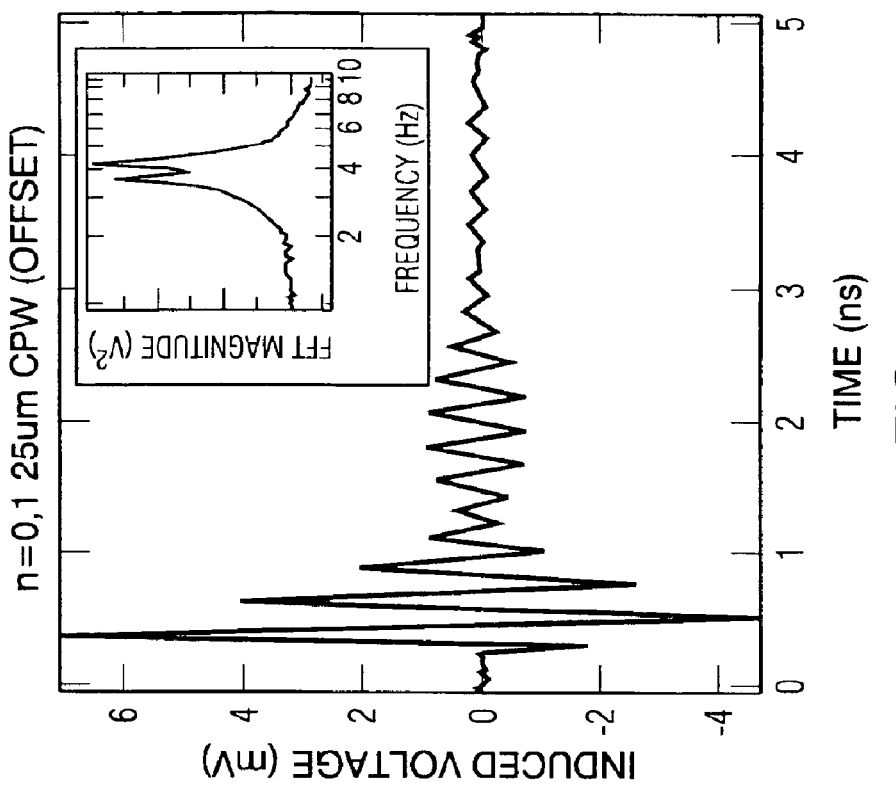
FIGS. 20 and 21 are graphs illustrating time domain results and fast fourier transforms (FFTs) of such time domain signatures for two different spin wave write modes.
Figure 20:
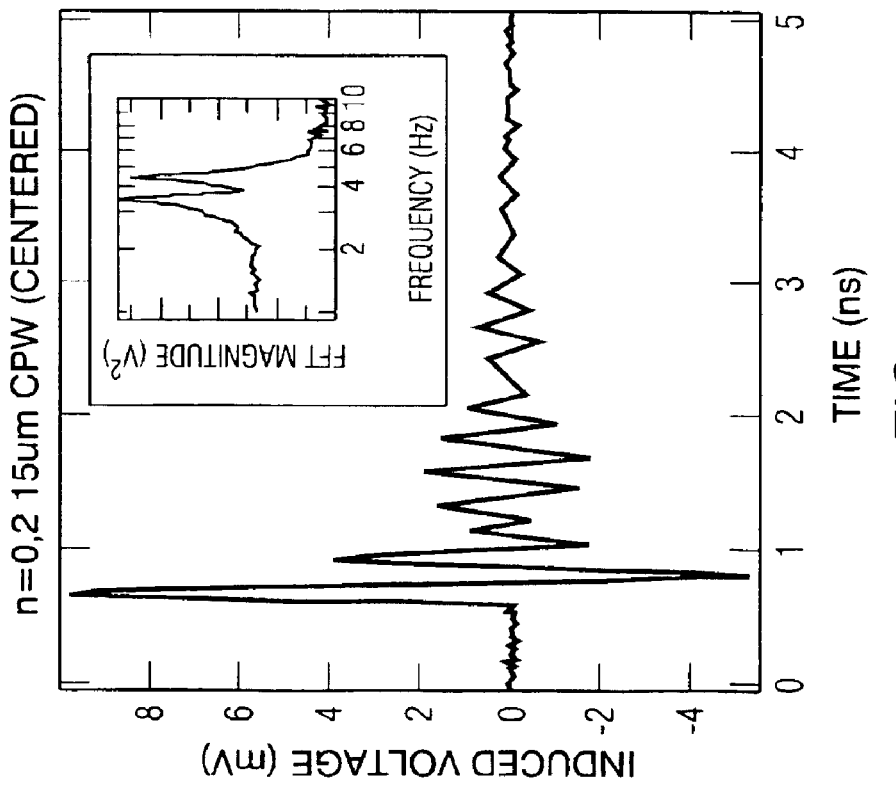

FIGS. 20 and 21 show time domain results for the n=1,3 (pinned) pumping geometry (FIG. 20) and n=1,2 (pinned) pumping geometry (FIG. 21) for 15 and 25 micron coplanar waveguides (CPW) relative to 50 micron squares, respectively. The squares were made of NiFe, while the waveguides were made of Cu. The n=1,2 geometry corresponds to the configuration shown in FIGS. 2, 7 and 12. The n=1,3 geometry corresponds to the configuration shown in FIGS. 3, 8 and 13. The time domain plots show beating in each response, which is caused by the interference of the two modes. The inserts in FIGS. 20 and 21 are fast fourier transforms (FFTs) of the time domain signatures, which show two distinct peaks corresponding to the two excited modes. The envelope of the beat effect is slower for the graph of FIG. 21 versus FIG. 20, and the separation between the two FFT peaks is clearly less, because the n=2 mode is closer in frequency to the n=1 mode than the n=3 mode. The mode being pumped has changed between the two graphs of FIGS. 20 and 21.

Figure 23:
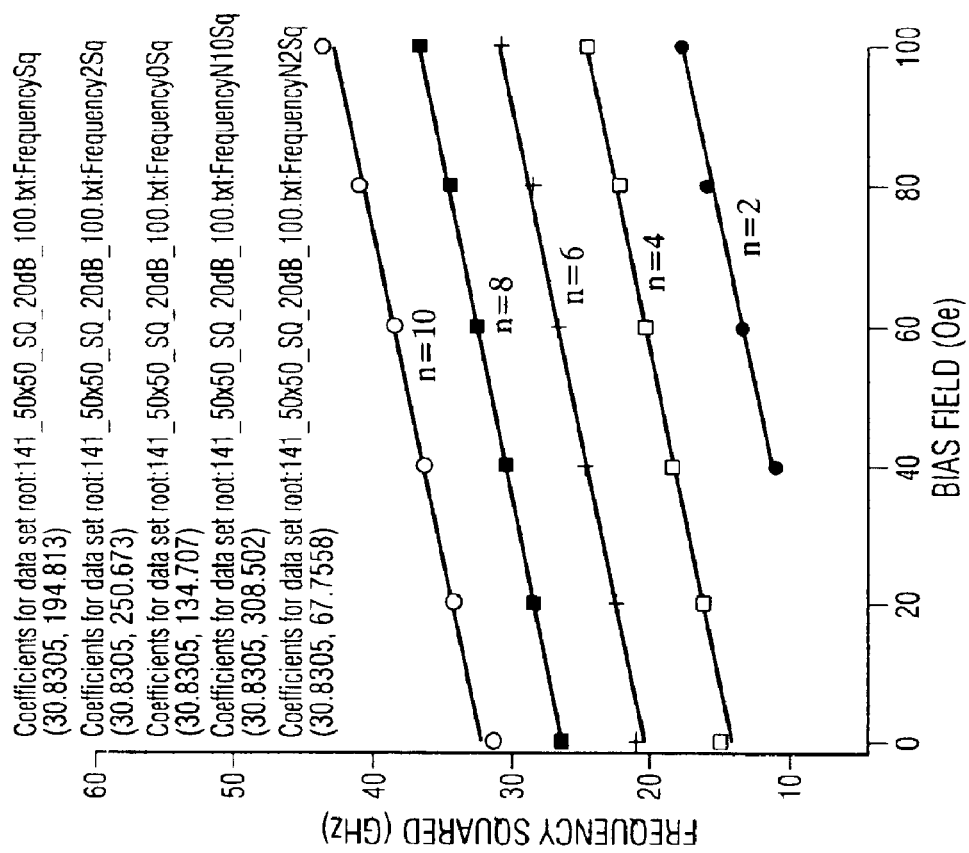
FIG. 23 is a graph illustrating the curves of FIG. 19 fitted to the Damon-Eshbach magnetostatic spin wave dispersion relation.
Figure 22:
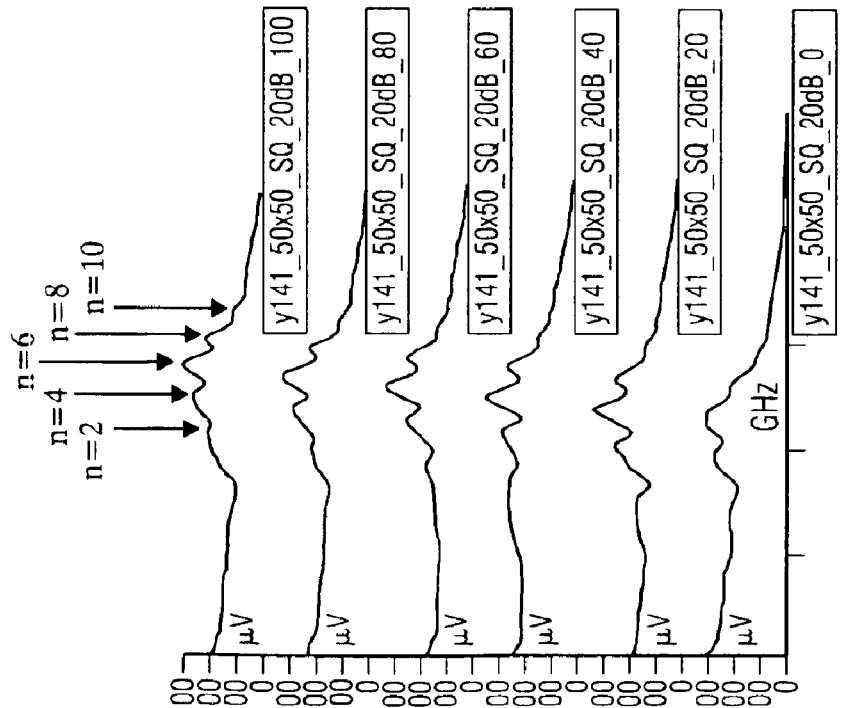
FIG. 22 is a graph illustrating a FFT of time domain data, illustrating multiple spin wave modes.

FIG. 22 shows a FFT of the time domain data for a 3 micron waveguide made of Cu on a 50×50 micron square made of NiFe. The FFT demonstrates multiple modes, which are shown by the arrows on the top graph. If the squared mode frequencies are plotted as a function of bias field, five curves are obtained, which are linear in bias field. The graph of FIG. 23 shows the five curves fitted to the standard Kittel equation with the mode correction. The shift in the frequency of the lines corresponds to the theoretically predicted frequency for the modes identified in FIG. 22.

Figure 24:
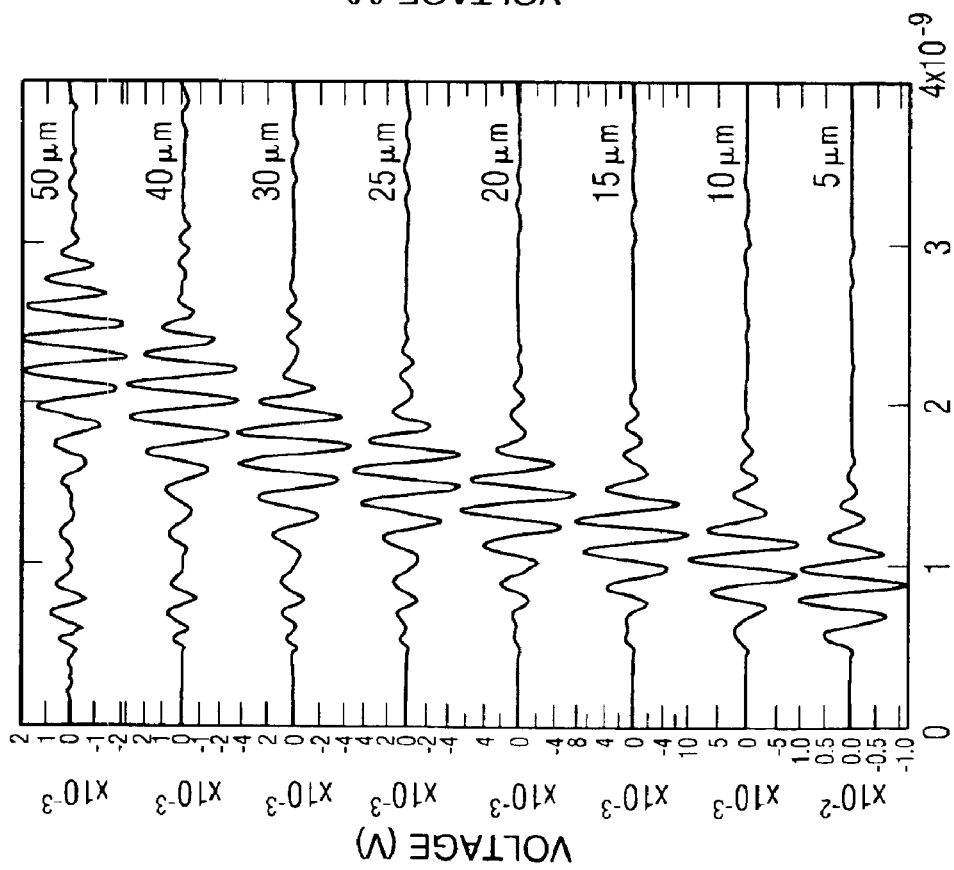
FIG. 24 is a graph illustrating test results from coupled waveguide measurements of flux propagation in relatively large squares of materials using asymmetric coplanar strip (ACPS) waveguides as both excitation and pickup waveguides.

FIG. 24 illustrates test results from coupled waveguide measurements of flux propagation in large squares (475×475 micron squares), made of NiFe using 3 micron Asymmetric Coplanar Strip (ACPS) waveguides made of Cu as both the excitation and pickup waveguides. In this test, the magnetic film is driven out of equilibrium with an applied magnetic field localized under one of two ACPS waveguides. This waveguide is then used to perform a measurement similar to those shown in FIGS. 20–23. A second ACPS is located a selected distance away from the first one, and the signal induced in the second waveguide is detected as well. FIG. 24 shows the signal induced in the second ACPS as a function of distance away from the first one. The response time is substantially broadened compared with the signals shown in FIGS. 20 and 21. Moreover, the response distinctly broadens as the response is measured further away spatially from the driving field.

Figure 25:
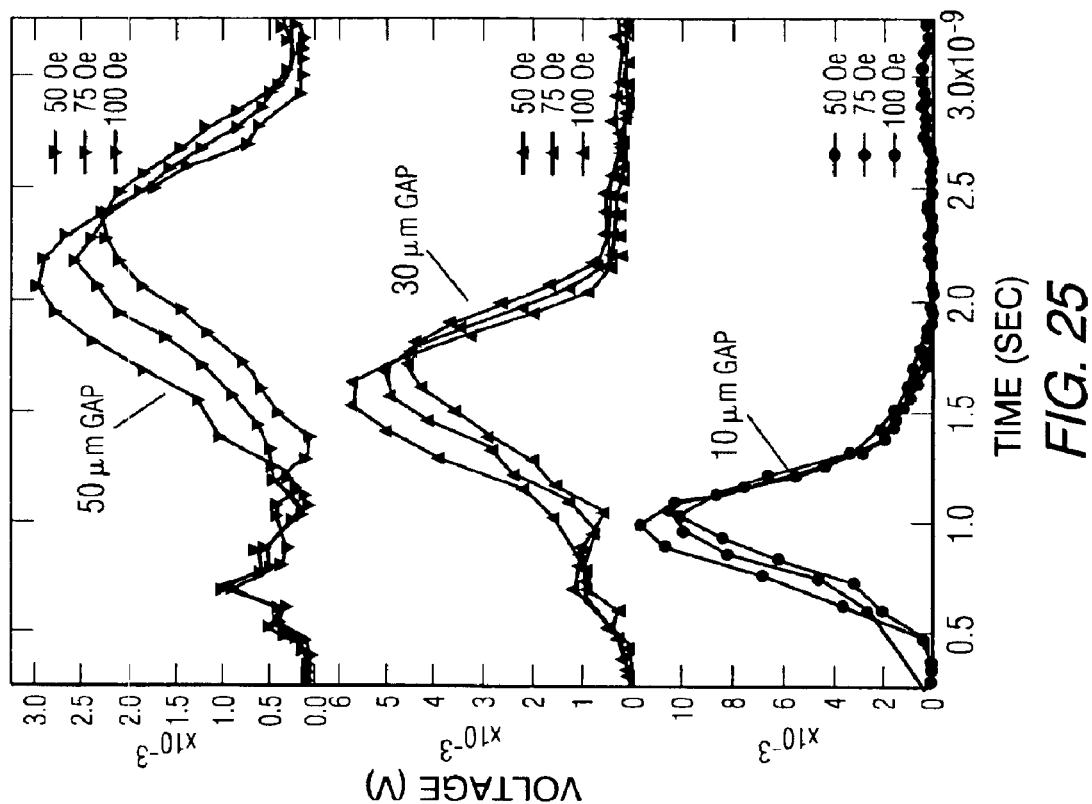
FIG. 25 is a graph illustrating an extracted envelope of the data shown in FIG. 24, demonstrating a flux pulse which broadens as the gap between the (ACPS) waveguides is increased.

The extracted envelope of the data in FIG. 24 is shown in FIG. 25, which broadens as measurements are made further away from the excitation source. In essence, the fast rise time field excites a flux pulse which propagates away from the drive field, taking energy with it. This broadening suggests that the flux pulse has a group velocity which is slower than the phase velocity, and is subject to significant dispersion. This pulse travels through the magnetic medium similar to ripples from a stone thrown in water. As the wave gets further from the disturbance, the longest wavelength components travel fastest followed by the shorter wavelength components (higher frequencies), leading to a broadening of the pulse width and a slow increase in total pulse amplitude. FIG. 25 shows that at high excitation speeds, yoke materials do not transmit the flux with either perfect speed or amplitude. Extremely short yokes may be required to avoid rise time degradation, while spatial pumping provides a means to drive the magnetization for optimum field output.

Figure 26:
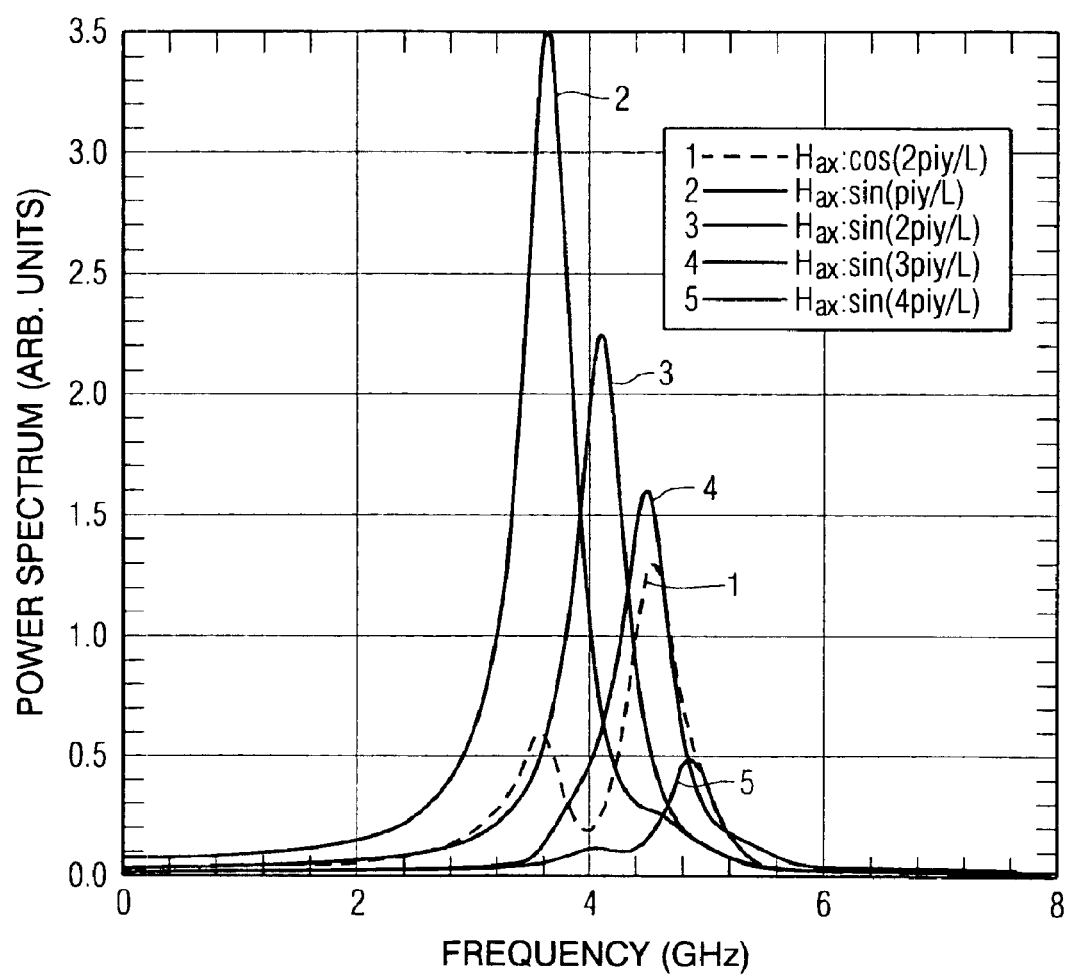
FIG. 26 is a graph of modeled power spectrum versus frequency, illustrating pumping of various frequencies by changing spatial field components.

FIG. 26 is a graph of a micromagnetically simulated power spectrum versus frequency, for five different excitation field geometries. The dashed line is the case shown experimentally in FIG. 17, where two modes are excited. The solid lines are for the special cases of different spatial harmonics, as would be used for the n=1, n=2, n=3, n=4 writer designs discussed above. The solid lines show that only a single mode is excited demonstrating that we can pump a single mode only and that we can control which mode is excited through the applied field spatial geometry. Going from curve 2–5, one sees that the resonance frequency increases as mode index increases, showing that we can push the drive frequency higher by preferentially exciting higher order modes.

The present invention utilizes spatial pumping of higher frequency magnetic excitations. The flux rise time slows the further it has to travel from a driving external field. At speeds beyond, e.g., 1 Gbit/sec, very short yoke lengths may be required with microstrips driving the magnetization very close to the ABS. In order to optimize the write properties, the dynamics and the dynamic spatial configuration of the magnetization should be controlled. In accordance with the present invention, the use of spatial pumping in a write head offers a means to achieve both of these requirements.

Whereas particular embodiments of this invention have been described above for purposes of illustration, it will be evident to those skilled in the art that numerous variations of the details of the present invention may be made without departing from the invention as defined in the appended claims.

What is claimed is:

1. A magnetic writer for use with a magnetic storage medium, comprising:
   at least one write pole; and
   at least one microstrip structured and arranged to generate magnetization in the at least one write pole comprising at least one spin wave mode comprising a spatially non-uniform magnetization pattern along a length of the write pole.

2. The magnetic writer of claim 1, wherein the non-uniform magnetization pattern of the at least one spin wave mode substantially corresponds to the formula $\sin(n\pi y/L+\Phi)$, where n is a mode index and is 1 or higher, L is the length of the write pole, y is a position along the length L of the write pole, and $\Phi$ is a phase factor determined by boundary conditions of the write pole.

3. The magnetic writer of claim 2, wherein n is from 1 to 5.

4. The magnetic writer of claim 2, wherein n is from 2 to 4.

5. The magnetic writer of claim 2, wherein n=1.

6. The magnetic writer of claim 2, wherein n=2.

7. The magnetic writer of claim 2, wherein n=3.

8. The magnetic writer of claim 2, wherein n=4.

9. The magnetic writer of claim 1, wherein the writer comprises a single microstrip.

10. The magnetic writer of claim 1, wherein the writer comprises two microstrips.

11. The magnetic writer of claim 1, wherein the writer comprises a single write pole.

12. The magnetic writer of claim 1, wherein the writer comprises two write poles.

13. The magnetic writer of claim 12, wherein the two write poles are connected by a yoke.

14. The magnetic writer of claim 1, wherein the writer is a longitudinal writer.

15. The magnetic writer of claim 1, wherein the writer is a perpendicular writer.

16. The magnetic writer of claim 1, wherein the at least one microstrip is within 100 nm of an air bearing surface of the writer.

17. The magnetic writer of claim 1, wherein the at least one microstrip has a width W, the at least one write pole has a length L, and the ratio of W:L is from about 1:2 to about 1:5.

18. The magnetic writer of claim 17, wherein the ratio of W:L is about 1:2 and the non-uniform magnetization pattern of the at least one spin wave mode substantially corresponds to the formula $\sin(n\pi y/L+\Phi)$, where n is a mode index and is equal to 1, L is the length of the write pole, y is a position along the length L of the write pole, and $\Phi$ is a phase factor determined by boundary conditions of the write pole.

19. The magnetic writer of claim 18, wherein the writer comprises a single microstrip located adjacent to a tip of the write pole.

20. The magnetic writer of claim 17, wherein the ratio of W:L is about 1:3 and the non-uniform magnetization pattern of the at least one spin wave mode substantially corresponds to the formula $\sin(n\pi y/L+\Phi)$, where n is a mode index and is equal to 2, L is the length of the write pole, y is a position along the length L of the write pole, and $\Phi$ is a phase factor determined by boundary conditions of the write pole.

21. The magnetic writer of claim 20, wherein the writer comprises a single microstrip located substantially mid-way along the length L of the write pole.

22. The magnetic writer of claim 20, wherein the writer comprises two microstrips, one of which is located adjacent to a tip of the at least one write pole and the other of which is located adjacent to an opposite end of the at least one write pole.

23. The magnetic writer of claim 17, wherein the ratio of W:L is about 1:4 and the non-uniform magnetization pattern of the at least one spin wave mode substantially corresponds to the formula $\sin(n\pi y/L+\Phi)$, where n is a mode index and is equal to 3, L is the length of the write pole, y is a position along the length L of the write pole, and $\Phi$ is a phase factor determined by boundary conditions of the write pole.

24. The magnetic writer of claim 23, wherein the writer comprises two microstrips located adjacent to each other near the middle of the length L of the write pole.

25. The magnetic writer of claim 24, wherein current is applied in opposite directions through the microstrips.

26. The magnetic writer of claim 17, wherein the ratio of W:L is about 1:5 and the non-uniform magnetization pattern of the at least one spin wave mode substantially corresponds to the formula $\sin(n\pi y/L+\Phi)$, where n is a mode index and is equal to 4, L is the length of the write pole, y is a position along the length L of the write pole, and Φ is a phase factor determined by boundary conditions of the write pole.

27. The magnetic writer of claim 26, wherein the writer comprises two microstrips, one of which is located at a two-fifths position along the length L of the write pole and the other of which is located at a four-fifths position along the length L of the write pole.

28. The magnetic writer of claim 27, wherein current is applied in the same direction through the microstrips.

29. A magnetic writer for use with a magnetic storage medium, comprising:

at least one write pole in proximity to the magnetic storage medium; and means for generating magnetization in the at least one write pole comprising at least one spin wave mode comprising a spatially non-uniform magnetization pattern along a length of the write pole to thereby apply a magnetic write field to the magnetic storage medium.

30. A method of applying a magnetic write field to a magnetic storage medium, comprising:

providing at least one write pole in proximity to the magnetic storage medium; and generating magnetization in the at least one write pole comprising at least one spin wave mode comprising a spatially non-uniform magnetization pattern along a length of the write pole to thereby apply the magnetic write field to the magnetic storage medium.

* * * * *

UNITED STATES PATENT AND TRADEMARK OFFICE
CERTIFICATE OF CORRECTION

PATENT NO. : 6,954,331 B2 Page 1 of 1
DATED : October 11, 2005
INVENTOR(S) : Thomas McLendon Crawford, Mark William Covington and Gregory John Parker It is certified that error appears in the above-identified patent and that said Letters Patent is hereby corrected as shown below:

<u>Column 6,</u>
Line 41, after "such" add -- as --.
Line 63, after "of" delete "a".

Signed and Sealed this

Fourth Day of April, 2006

JON W. DUDAS
*Director of the United States Patent and Trademark Office*